(12) United States Patent
Hu

(10) Patent No.: US 10,002,534 B2
(45) Date of Patent: Jun. 19, 2018

(54) VEHICLE DRIVING ASSISTANCE APPARATUS

(71) Applicant: DENSO CORPORATION, Kariya, Aichi-pref. (JP)

(72) Inventor: Jian Hu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 15/333,009

(22) Filed: Oct. 24, 2016

(65) Prior Publication Data

US 2017/0116853 A1    Apr. 27, 2017

(30) Foreign Application Priority Data

Oct. 26, 2015   (JP) .................................. 2015-209751

(51) Int. Cl.
| | |
|---|---|
| *G08G 1/09* | (2006.01) |
| *G08G 1/0967* | (2006.01) |
| *B60K 35/00* | (2006.01) |
| *B60R 1/00* | (2006.01) |
| *G06K 9/00* | (2006.01) |
| *G08G 1/0962* | (2006.01) |

(52) U.S. Cl.
CPC ........... *G08G 1/0967* (2013.01); *B60K 35/00* (2013.01); *B60R 1/00* (2013.01); *G06K 9/00791* (2013.01); *G08G 1/09623* (2013.01); *G08G 1/09626* (2013.01); *B60K 2350/1076* (2013.01); *B60K 2350/905* (2013.01); *B60R 2300/804* (2013.01); *B60R 2300/8086* (2013.01)

(58) Field of Classification Search
CPC ......... H01L 2924/0002; H01L 2924/00; H01L 23/576; B60K 2350/1076; B60K 2350/905; B60K 35/00; B60R 1/00; B60R 2300/804; B60R 2300/8086; B60T 2201/08; B60T 2201/082; B60T 8/173; B60T 8/5006
USPC ............... 340/905, 907, 937, 901, 902, 904, 340/992–993, 988, 439, 575–576, 438, 340/441, 466–467
See application file for complete search history.

(56) References Cited

U.S. PATENT DOCUMENTS

| | | | | |
|---|---|---|---|---|
| 5,757,949 A | * | 5/1998 | Kinoshita | ............... B60K 28/10 340/437 |
| 5,815,070 A | * | 9/1998 | Yoshikawa | ............ G08B 21/06 180/272 |

(Continued)

*Primary Examiner* — Daniel Previl
(74) *Attorney, Agent, or Firm* — Knobbe, Martens, Olson & Bear, LLP

(57) ABSTRACT

In a driving assistance apparatus mounted in a vehicle, a detector detects a lane change of the vehicle, a determiner determines a position of a lane traveled by the vehicle immediately after the lane change detected by the detector relative to a position of a lane traveled by the vehicle immediately before the lane change, and a verifier determines whether or not there is misrecognition of speed limits during travel of the vehicle based on a positional relationship between the lanes traveled by the vehicle immediately before and after the lane change detected by the detector and a comparison between recognized speed limits for the respective lanes traveled by the vehicle immediately before and after the lane change detected by the detector. If it is determined that there is misrecognition of speed limits, a reporter reports the recognized speed limit to a driver of the vehicle in a prescribed manner.

9 Claims, 5 Drawing Sheets

(56) References Cited

U.S. PATENT DOCUMENTS

| | | | |
|---|---|---|---|
| 6,560,529 B1 * | 5/2003 | Janssen | G01C 21/28 340/988 |
| 9,605,971 B2 * | 3/2017 | Niehsen | G01C 21/3658 |
| 2007/0177014 A1 | 8/2007 | Frenzel et al. | |
| 2009/0243883 A1 * | 10/2009 | Simon | G08G 1/096716 340/905 |
| 2015/0213319 A1 | 7/2015 | Frenzel et al. | |
| 2015/0215550 A1 | 7/2015 | Frenzel et al. | |

\* cited by examiner

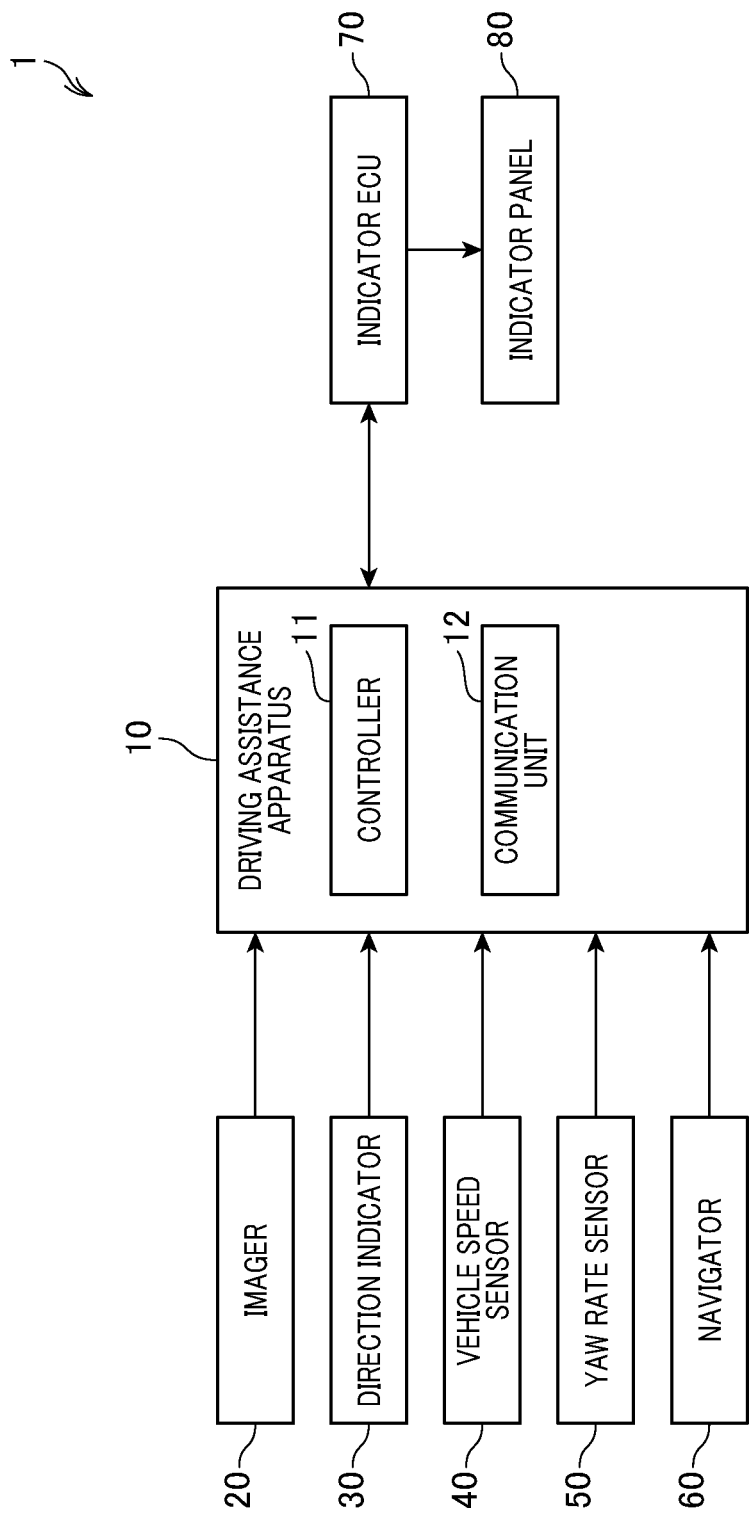

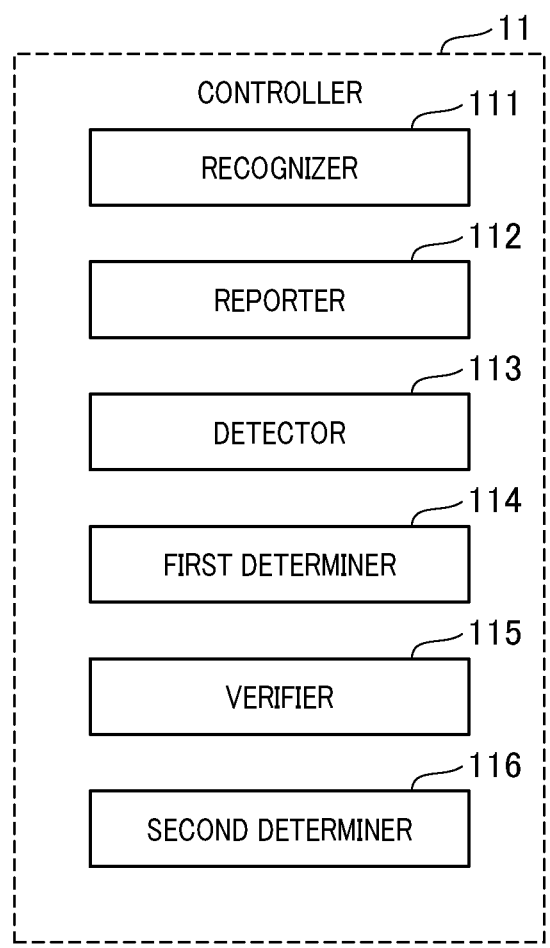

VEHICLE DRIVING ASSISTANCE APPARATUS

CROSS-REFERENCE TO RELATED APPLICATION

This application is based on and claims the benefit of priority from earlier Japanese Patent Application No. 2015-209751 filed Oct. 26, 2015, the description of which is incorporated herein by reference.

BACKGROUND

Technical Field

The present invention relates to a technique for reporting a speed limit.

Related Art

Japanese Patent No. 4604088 discloses a technique for recognizing a traffic sign from a captured image. Such a technique is capable of recognizing a speed limit indicated by the traffic sign and reporting the speed limit to a vehicle driver or the like.

However, there are some roads where different speed limits are set for respective lanes of the road. When recognizing a speed limit from a traffic sign during travel on such a road, a driver may mistakenly recognize a speed limit indicated by a traffic sign on another lane than the lane in which a driver's own vehicle is traveling as a speed limit for the lane in which the own vehicle is traveling, due to, for example, a direction of the own vehicle.

In consideration of the foregoing, exemplary embodiments of the present invention are directed to providing a technique for preventing faulty speed limit recognition disconcerting to a vehicle driver.

SUMMARY

In accordance with an exemplary embodiment of the present invention, there is provided a driving assistance apparatus mounted in a vehicle. The apparatus includes: a recognizer configured to, based on a captured image around the vehicle, recognize a maximum speed allowed for a lane in which the vehicle is traveling; a reporter configured to report a recognized speed limit that is the maximum speed recognized by the recognizer; a detector configured to detect a lane change of the vehicle; a determiner configured to determine a position of a lane traveled by the vehicle immediately after the lane change detected by the detector relative to a position of a lane traveled by the vehicle immediately before the lane change; and a verifier configured to, based on a positional relationship between the lanes traveled by the vehicle immediately before and after the lane change detected by the detector and a comparison between recognized speed limits for the respective lanes traveled by the vehicle immediately before and after the lane change detected by the detector, determine whether or not there is misrecognition of speed limits during travel of the vehicle. The reporter is configured to, if it is determined that there is misrecognition of speed limits, report the recognized speed limit to a driver of the vehicle in a prescribed manner.

During recognition of a maximum speed (hereinafter referred to as a speed limit) allowed for a lane in which the vehicle is traveling based on a captured image around the vehicle, there may be misrecognition of speed limits. In the case of a one-directional road section having a plurality of lanes, it may be supposed that different speed limits are set for the respective lanes. In the case of the right-hand traffic road, a one-directional road section having a plurality of lanes may be normally configured such that a speed limit for one of the lanes is set equal to or greater than a speed limit for its right adjacent lane. In the case of the left-hand traffic road, a one-directional road section having a plurality of lanes may be normally configured such that a speed limit for one of the lanes is set equal to or greater than a speed limit for its left adjacent lane.

The driving assistance apparatus configured as above determines whether or not there is misrecognition of speed limits based on a positional relationship between lanes immediately before and after a lane change made by the own vehicle and a comparison between speed limits for these lanes recognized during travel of the own vehicle. If it is determined that there is misrecognition of speed limits, the driving assistance apparatus reports a recognized speed limit to the vehicle driver in a prescribed manner.

With this configuration, the driving assistance apparatus can report to the vehicle driver that there is misrecognition of speed limits or can avoid reporting a misrecognized speed limit to the vehicle driver, which can prevent faulty speed limit recognition disconcerting to the vehicle driver.

BRIEF DESCRIPTION OF THE DRAWINGS

FIG. 1A is a block diagram of a vehicle-mounted system in accordance with one embodiment of the present invention;

FIG. 1B is a functional block diagram of a controller of a driving assistance apparatus in the vehicle-mounted system;

DESCRIPTION OF SPECIFIC EMBODIMENTS

Figure 2:
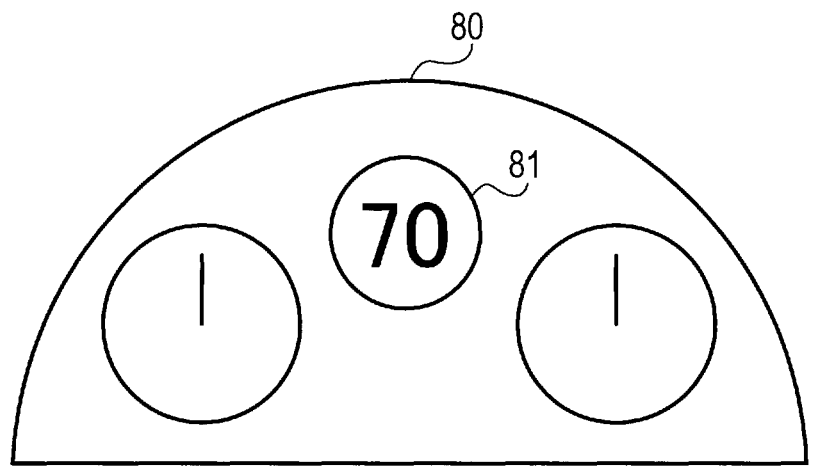
FIG. 2 is an example of an indicator panel.

Embodiments of the present invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

1. System Configuration

A vehicle-mounted system 1 shown in FIG. 1 is configured to recognize a maximum speed (hereinafter referred to as a speed limit) allowed for a lane in which an own vehicle is traveling from indicators, such as a road traffic sign and a road marking, appearing in a captured image around the own vehicle. The own vehicle refers to a vehicle carrying the vehicle-mounted system 1. The vehicle-mounted system 1 is further configured to report the recognized speed limit to a driver or other passengers of the own vehicle. The vehicle-mounted system 1 includes a driving assistance apparatus 10, an imager 20, a direction indicator 30, and a vehicle speed sensor 40, a yaw rate sensor 50, a navigator 60, and an indicator electrical control unit (ECU) 70.

The driving assistance apparatus 10 includes a controller 11 and a communication unit 12.

The controller 11 is configured as a microcomputer including a central processing unit (CPU), a random access memory (RAM), a read only memory (ROM), an input-output interface, and other components. The controller 11 controls various components of the driving assistance apparatus 10 by the CPU executing programs stored in the ROM or programs loaded to the RAM. In some other embodiments, various processes to be performed in the controller 11 may be implemented by a logic circuit or an analog circuit or the like.

The communication unit 12 is configured to communicate with other devices mounted in the own vehicle via an in-vehicle local area network (LAN) (not shown).

The imager 20 is configured as a camera looking in a forward direction of the own vehicle. The imager 20 is configured to capture an image looking in the forward direction of the own vehicle every predetermined time interval to output a video signal of the captured image to the driving assistance apparatus 10.

The direction indicator 30 is configured to blink directional signal lights in response to a driver's operation to indicate a direction in which the own vehicle will turn. The direction indicator 30 and the driving assistance apparatus 10 may be connected to each other via the in-vehicle LAN.

The vehicle speed sensor 40 is configured to detect a vehicle speed of the own vehicle. The driving assistance apparatus 10 is configured to, based on a signal from the vehicle speed sensor 40, detect the vehicle speed of the own vehicle. The vehicle speed sensor 40 may be provided in a device connected to the driving assistance apparatus 10 via the in-vehicle LAN, which device may in turn forward the vehicle speed detected by the vehicle speed sensor 40 to the driving assistance apparatus 10.

The yaw rate sensor 50 is configured to detect a yaw rate of the own vehicle. The driving assistance apparatus 10 is configured to, based on a signal from the yaw rate sensor 50, detect the yaw rate of the own vehicle. The yaw rate sensor 50 may be provided in a device connected to the driving assistance apparatus 10 via the in-vehicle LAN, which device may in turn forward the yaw rate detected by the yaw rate sensor 50 to the driving assistance apparatus 10.

The navigator 60 is configured to use a satellite positioning system, such as GPS, to detect a location of the own-vehicle based on map data. The location of the own vehicle may be used for route guidance, facility search or various kinds of driving assistance. The navigator 60 and the driving assistance apparatus 10 may be connected to each other via the in-vehicle LAN.

The indicator ECU 70 is configured to display a state of the own vehicle, such as a vehicle speed or the like of the own vehicle, on an indicator panel 80. As shown in FIG. 2, the indicator panel 80 is provided with a display 81 for displaying the speed limit recognized by the vehicle-mounted system 1. The display 81 may be configured as a display, such as a liquid crystal display. The indicator ECU 70 and the driving assistance apparatus 10 may be connected to each other via the in-vehicle LAN.

2. Processing

The driving assistance apparatus 10 in the vehicle-mounted system 1 is configured to, based on the video signal from the imager 20, generate a captured image looking in a forward direction of the own vehicle and recognize traffic indicators, such as a road traffic sign provided along a road on which the own vehicle is traveling and a road marking drawn on the surface of the road on which the own vehicle is traveling. The driving assistance apparatus 10 is configured to recognize a speed limit indicated by a traffic indicator and display the recognized speed limit on the display 81 of the indicator panel 80. Alternatively, the recognized speed limit may be displayed using a display of the navigator 60 or a head-up display projected onto a front windshield.

In the case of a one-directional road section having a plurality of lanes, it may be supposed that different speed limits are set for the respective lanes. In such a case, the vehicle-mounted system 1 is configured to determine to which lane each traffic indicator appearing in the captured image corresponds, recognize a speed limit indicated by the traffic indicator corresponding to the lane in which the own vehicle is traveling, and display the recognized speed limit on the indicator panel 80. However, depending on conditions of the traffic indicators appearing in the captured image, a traffic indicator corresponding to another lane different from the lane in which the own vehicle is traveling may be mistakenly recognized as the traffic indicator corresponding to the lane in which the own vehicle is traveling. In addition, the speed limit indicated by the traffic indicator corresponding to the lane in which the own vehicle is traveling may be mistakenly recognized. More specifically, for example, a speed limit of 40 km/h may be mistakenly recognized as a speed limit of 140 km/h.

To address such misrecognition, if a lane change has been made, the vehicle-mounted system 1 is configured to, based on a positional relationship between lanes immediately before and after the lane change and a comparison between recognized speed limits for these lanes during travel of the own vehicle, verify whether or not the speed limit for the lane immediately after the lane change has been mistakenly recognized.

Figure 3:
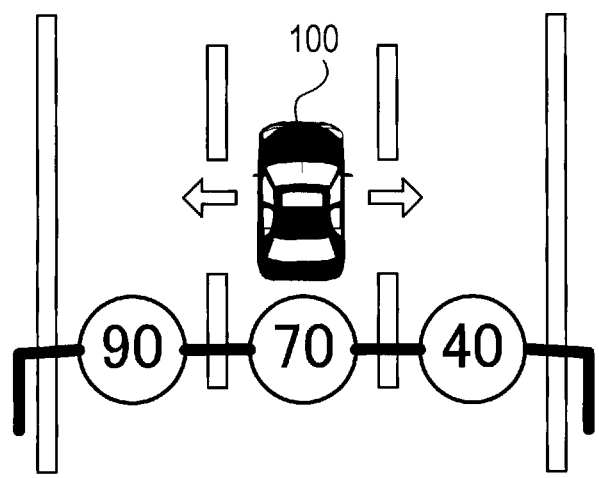
FIG. 3 is an illustration of a right-hand traffic road having different speed limits set for respective lanes of the road.

In the case of the right-hand traffic road, a one-directional road section having a plurality of lanes may be normally configured such that a speed limit for one of the lanes is set equal to or greater than a speed limit for its right adjacent lane, as shown in FIG. 3. Under assumption that the own vehicle 100 has made a rightward lane change, if the recognized speed limit for the lane immediately after the lane change is greater than the recognized speed limit for the lane immediately before the lane change, at least one of the speed limits for the lanes immediately before and after the lane change is considered to be mistakenly recognized. Similarly, under assumption that the own vehicle 100 has made a leftward lane change, if the recognized speed limit for the lane immediately after the lane change is less than the recognized speed limit for the lane immediately before the lane change, at least one of the speed limits for the lanes immediately before and after the lane change is considered to be mistakenly recognized.

In the case of the left-hand traffic road, a one-directional road section having a plurality of lanes may be normally configured such that a speed limit for one of the lanes is set equal to or greater than a speed limit for its left adjacent lane. Under assumption that the own vehicle 100 has made a rightward lane change, if the recognized speed limit for the lane immediately after the lane change is less than the recognized speed limit for the lane immediately before the lane change, at least one of the speed limits for the lanes immediately before and after the lane change is considered to be mistakenly recognized. Similarly, under assumption that the own vehicle 100 has made a leftward lane change, if the recognized speed limit for the lane immediately after the lane change is greater than the recognized speed limit for the lane immediately before the lane change, at least one of the speed limits for the lanes immediately before and after the lane change is considered to be mistakenly recognized.

Figure 4:
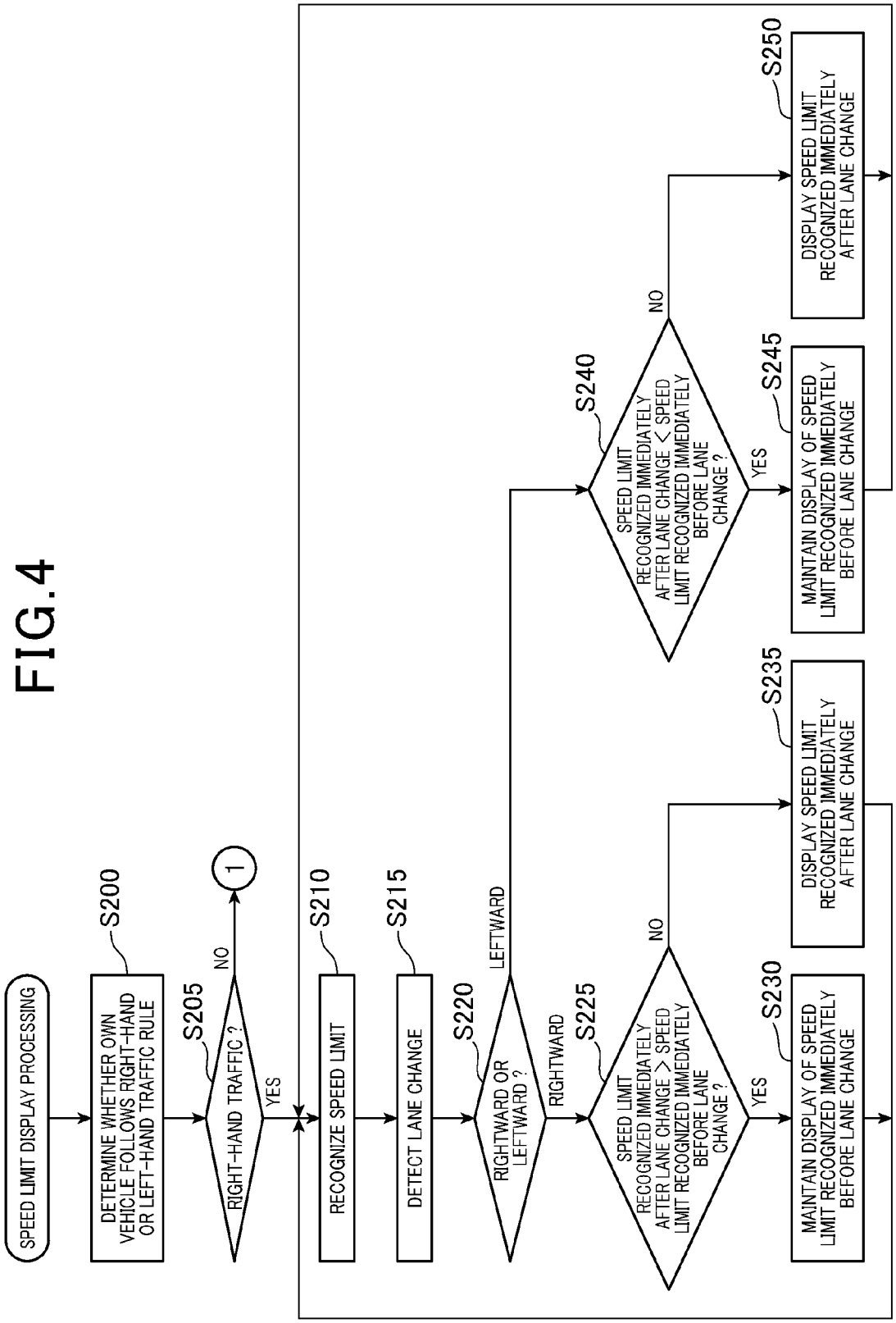
FIG. 4 is a flowchart of speed limit display processing.
Figure 5:
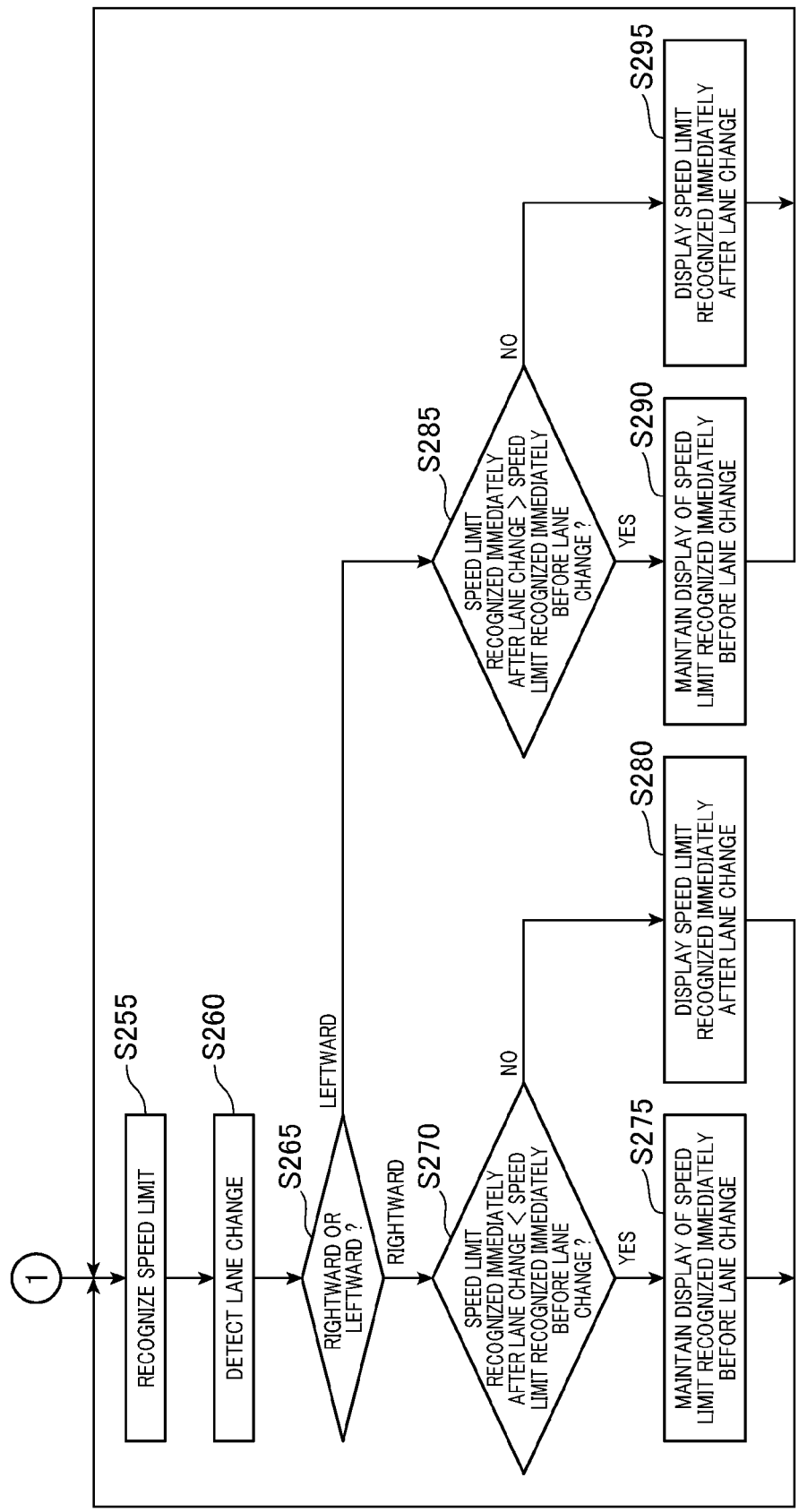
FIG. 5 is a continuation of the flowchart of FIG. 4.

Speed limit display processing for displaying a speed limit recognized from a captured image looking in the forward direction of the own vehicle will now be described with reference to FIGS. 4 and 5. This processing is performed in the driving assistance apparatus 10 of the vehicle-mounted system 1. This processing is imitated at startup of own-vehicle driving.

In step S200, the controller 11 of the driving assistance apparatus 10 determines whether or not the own vehicle follows the right-hand traffic rule or the left-hand traffic rule. The process flow then proceeds to step S205. More specifically, in step S200, the determination may be made based on destination information stored in a non-volatile storage (not shown) or on a state of a setting switch for defining an operating condition of the apparatus 10.

Alternatively, in the navigator 60, a determination as to whether the own vehicle lies within a right-hand traffic area or a left-hand traffic may be made based on a location of the own vehicle and map data. The driving assistance apparatus 10 may be configured to acquire the determination result from the navigator 60, and based on the determination result, determine whether the own vehicle follows the right-hand traffic rule or the left-hand traffic rule.

In step S205, the controller 11 determines whether or not the own vehicle follows the right-hand traffic rule. If it is determined that the own vehicle follows the right-hand traffic rule, then the process flow proceeds to step S210. If it is determined that the own vehicle follows the left-hand traffic rule, then the process flow proceeds to step S255 shown in FIG. 5.

In step S210, the controller 11 acquires a captured image looking in the forward direction of the own vehicle from the imager 20, and from the captured image, recognize a speed limit indicated by a traffic indicator appearing in the captured image.

In parallel with the operation in step S210, the controller 11 detects a lane change of the own vehicle in step S225. More specifically, for example, the controller 11 may determine a travel trajectory of the own vehicle based on a yaw rate detected by the yaw rate sensor 50 and a vehicle speed detected by the vehicle speed sensor 40, and based on the travel trajectory of the own vehicle, determine whether or not the own vehicle has made a lane change. Alternatively, given that the imager 20 is configured to capture an image of an area including a road surface of the road on which the own vehicle is traveling, the controller 11 may detect a positional change of a lane partition line appearing in the captured image, and based on the positional change of the lane partition line, determine whether or not the own vehicle has traveled across the lane partition line. If it is determined that the own vehicle has traveled across the lane partition line, the controller 11 may determine that the own vehicle has made a lane change.

The controller 11 repeatedly performs operations in steps S210 and S215. If the controller 11 has recognized a speed limit in step S210, the controller 11 communicates with the indicator ECU 70 to display the recognized speed limit on the indicator panel 80. If the controller 11 has detected a lane change of the own vehicle in step S215 and has recognized a speed limit immediately after the lane change of the own vehicle detected in step S215, then the process flow proceeds to step S220.

In step S220, the controller 11 determines whether the own vehicle has made a rightward or leftward lane change. More specifically, the controller 11 may determine whether the own vehicle has made a rightward or leftward lane change based on a shape of the travel trajectory or a positional change of the lane partition line used to determine whether or not the own vehicle has made a lane change. Alternatively, the controller 11 may communicate with the direction indicator 30 to capture an operational state of the directional signal lights during the lane change, and based on the captured operational state of the directional signal lights, determine whether the own vehicle has made a rightward or leftward lane change.

If it is determined that the own vehicle has made a rightward lane change, that is, a lane traveled immediately after the lane change is positioned rightward of a lane traveled immediately before the lane change, then the process flow proceeds to step S225. If it is determined that the own vehicle has made a leftward lane change, that is, a lane traveled immediately after the lane change is positioned leftward of a lane traveled immediately before the lane change, then the process flow proceeds to step S240.

In step S225, the controller 11 determines whether or not a speed limit recognized immediately after the lane change (also referred to as a last recognized speed limit) is greater than a speed limit recognized immediately before the lane change. If it is determined that the speed limit recognized immediately after the lane change is greater than the speed limit recognized immediately before the lane change, then the process flow proceeds to step S230. If it is determined that the speed limit recognized immediately after the lane change is equal to or less than the speed limit recognized immediately before the lane change, then the process flow proceeds to step S235.

In step S230, the controller 11 decides that there is misrecognition of speed limits, and then maintains a speed limit display state on the indicator panel 80. That is, the controller 11 continues to display the speed limit recognized immediately before the lane change on the indicator panel 80.

In step S235, the controller 11 decides that there is no misrecognition of speed limits. The controller 11 communicates with the indicator ECU 70 to display the last recognized speed, i.e., the speed limit recognized immediately after the lane change on the indicator panel 80. The process flow then proceeds to step S210.

If in step S220 it is determined that the own vehicle has made a leftward lane change, that is, a lane traveled immediately after the lane change is positioned leftward of a lane traveled immediately before the lane change, then the process flow proceeds to step S240. In step S240, the controller 11 determines whether or not a speed limit recognized immediately after the lane change is less than a speed limit recognized immediately before the lane change. If it is determined that the speed limit recognized immediately after the lane change is less than the speed limit recognized immediately before the lane change, then the process flow proceeds to step S245. If it is determined that the speed limit recognized immediately after the lane change is equal to or greater than the speed limit recognized immediately before the lane change, then the process flow proceeds to step S250.

In step S245, as in step S230, the controller 11 decides that there is misrecognition of speed limits, and then maintains a speed limit display state on the indicator panel 80. That is, the controller 11 continues to display the speed limit recognized immediately before the lane change on the indicator panel 80. The process flow then proceeds to step S210.

In step S250, as in step S235, the controller 11 decides that there is no misrecognition of speed limits. The controller 11 communicates with the indicator ECU 70 to display the last recognized speed, i.e., the speed limit recognized immediately after the lane change on the indicator panel 80. The process flow then proceeds to step S210.

If in step S205 it is determined that the own vehicle follows the left-hand traffic rule, then the process flow proceeds to step S255. As in steps S210 and S215, the controller 11 repeatedly performs operations in steps S255 and S260. If in step S255 the controller 11 has recognized a speed limit indicated by a traffic indicator appearing in the captured image looking in the forward direction of the own vehicle, the controller 11 communicates with the indicator ECU 70 to display the recognized speed limit on the indicator panel 80.

If the controller 11 has detected a lane change of the own vehicle in step S260 and has recognized a speed limit in step S255 immediately after having detecting the lane change of the own vehicle in step S260, then the process flow proceeds to step S265. In step S265, as in step S220, the controller 11 determines whether the own vehicle has made a rightward or leftward lane change. If it is determined that the own vehicle has made a rightward lane change, then the process flow proceeds to step S270. If it is determined that the own vehicle has made a leftward lane change, then the process flow proceeds to step S285.

In step S270, as in step S240, the controller 11 determines whether or not a speed limit recognized immediately after the lane change (also referred to as a last recognized speed limit) is less than a speed limit recognized immediately before the lane change. If it is determined that the speed limit recognized immediately after the lane change is less than the speed limit recognized immediately before the lane change, then the process flow proceeds to step S275. If it is determined that the speed limit recognized immediately after the lane change is equal to or greater than the speed limit recognized immediately before the lane change, then the process flow proceeds to step S280.

In step S275, as in step S230, the controller 11 decides that there is misrecognition of speed limits, and then maintains a speed limit display state on the indicator panel 80. That is, the controller 11 continues to display the speed limit recognized immediately before the lane change on the indicator panel 80. The process flow then proceeds to step S255.

In step S280, as in step S235, the controller 11 decides that there is no misrecognition of speed limits. The controller 11 communicates with the indicator ECU 70 to display the last recognized speed, i.e., the speed limit recognized immediately after the lane change on the indicator panel 80. The process flow then proceeds to step S255.

In step S285, as in step S225, the controller 11 determines whether or not a speed limit recognized immediately after the lane change is greater than a speed limit recognized immediately before the lane change. If it is determined that the speed limit recognized immediately after the lane change is greater than the speed limit recognized immediately before the lane change, then the process flow proceeds to step S290. If it is determined that the speed limit recognized immediately after the lane change is equal to or less than the speed limit recognized immediately before the lane change, then the process flow proceeds to step S295.

In step S290, as in step S230, the controller 11 decides that there is misrecognition of speed limits, and then maintains a speed limit display state on the indicator panel 80. That is, the controller 11 continues to display the speed limit recognized immediately before the lane change on the indicator panel 80. The process flow then proceeds to step S255.

In step S295, as in step S235, the controller 11 decides that there is no misrecognition of speed limits. The controller 11 communicates with the indicator ECU 70 to display the last recognized speed, i.e., the speed limit recognized immediately after the lane change on the indicator panel 80. The process flow then proceeds to step S255. FIG. 18 is a functional block diagram of the controller 11 of the driving assistance apparatus 10. The controller 11 includes a recognizer 111 for performing steps S210 and S255 of the above speed limit display processing, a reporter 112 for performing steps S210, S230, S235, S245, S250, S255, S275, S280, S290, and S295, a detector 113 for performing steps S215 and S260, a first determiner 114 for performing steps S220 and S265, a verifier 115 for performing steps S225, S240, S270, and S285, and a second determiner 116 for performing step S205. Functions of these blocks are implemented by the CPU executing programs stored in the ROM or loaded to the RAM. Alternatively, these functions of the controller 11 may be implemented by logic circuits or analog circuits.

3. Advantages

The embodiment described above can provide the following advantages.

(1) The vehicle-mounted system 1 of the present embodiment is configured to, based on a positional relationship between lanes immediately before and after a lane change made by the own vehicle and a comparison between speed limits for these lanes recognized during travel of the own vehicle, determine whether or not there is misrecognition of speed limits. If it is determined that there is misrecognition of speed limits, the speed limit recognized immediately before the lane change is left displayed on the indicator panel 80. This configuration can avoid reporting a misrecognized speed limit to a vehicle driver, which can thus prevent faulty speed limit recognition disconcerting to the vehicle driver.

(2) The vehicle-mounted system 1 of the present embodiment is configured to, taking into account whether the own vehicle is traveling on a right-hand traffic road or a left-hand traffic road, determine whether or not there is misrecognition of speed limits for lanes traveled immediately after and before a lane change. This configuration can make it possible to accurately determine whether or not there is misrecognition of speed limits, regardless of a traffic rule in an area where the own vehicle is traveling.

3. Modifications

It is to be understood that the invention is not to be limited to the specific embodiment disclosed above and that modifications and other embodiments are intended to be included within the scope of the appended claims.

(M1) In the vehicle-mounted system 1 of the above embodiment, the controller 11 is configured to maintain a speed limit display state on the indicator panel 80 in steps S230, S245, S275, and S290 of the speed limit display processing. Alternatively, the controller 11 may be configured to, in these steps S230, S245, S275, and S290 of the speed limit display processing, remove or clear the recognized speed limit displayed on the indicator panel 80. Still alternatively, the controller 11 may be configured to, in these steps S230, S245, S275, and S290 of the speed limit display processing, display on the indicator panel 80 that there is misrecognition of speed limits. Such alternative configurations can also prevent faulty speed limit recognition disconcerting to the vehicle driver.

(M2) In the vehicle-mounted system 1 of the above embodiment, the controller 11 is configured to display a recognized speed limit on the indicator panel 80, thereby reporting the recognized speed limit to the vehicle driver. Alternatively, the controller 11 may be configured to output a voice from a speaker (not shown), thereby reporting the recognized speed limit to the vehicle driver. In such a modification, the controller 11 of the driving assistance apparatus 10 may be configured to, in steps S210, S235, S250, S255, S280, and S295 of the speed limit display processing, output the last recognized speed limit via voice. The controller 11 may be configured to, in steps S230, S245, S275, and S290 of the speed limit display processing to be performed if there is misrecognition of speed limits, output the speed limit recognized immediately before the lane change via voice. Still alternatively, in these steps S230, S245, S275, and S290 of the speed limit display processing, the controller 11 of the driving assistance apparatus 10 may be configured not to output a recognized speed limit via voice or may be configured to output a voice message that there is misrecognition of speed limits.

(M3) The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

(M4) It should be appreciated that the present invention is not to be limited to the vehicle-mounted systems disclosed above and that the present invention can be implemented in numerous ways, including a single vehicle-mounted device corresponding to any one of the vehicle-mounted systems disclosed above, a program for enabling a computer to function as any one of the vehicle-mounted systems disclosed above, a non-transitory computer readable storage medium storing such a program, and a method corresponding to the speed limit display processing disclosed above.

What is claimed is:

1. A driving assistance apparatus mounted in a vehicle, comprising:
    a maximum speed recognizer configured to, based on a captured image around the vehicle, recognize a maximum speed allowed for a lane in which the vehicle is traveling;
    a recognized speed limit reporter configured to report a recognized speed limit that is the maximum speed recognized by the maximum speed recognizer;
    a lane change detector configured to detect a lane change of the vehicle;
    a lane position determiner configured to determine a position of a lane traveled by the vehicle immediately after the lane change detected by the lane change detector relative to a position of a lane traveled by the vehicle immediately before the lane change; and
    a speed limits misrecognition verifier configured to, based on a positional relationship between the lanes traveled by the vehicle immediately before and after the lane change detected by the lane change detector and a comparison between recognized speed limits for the respective lanes traveled by the vehicle immediately before and after the lane change detected by the lane change detector, determine whether or not there is misrecognition of speed limits during travel of the vehicle,
    wherein the recognized speed limit reporter is configured to, if determined that there is misrecognition of speed limits, report the recognized speed limit to a driver of the vehicle in a prescribed manner.

2. The apparatus according to claim 1, wherein the recognized speed limit reporter is configured to display the recognized speed limit on a display, and if the lane change is detected by the lane change detector during display of the recognized speed limit and then determined by the speed limits misrecognition verifier that there is misrecognition of speed limits, continue to display on the display the speed limit recognized immediately before the lane change.

3. The apparatus according to claim 1, wherein the recognized speed limit reporter is configured to display the recognized speed limit on a display, and if the lane change is detected by the lane change detector during display of the recognized speed limit and then determined by the speed limits misrecognition verifier that there is misrecognition of speed limits, clear the recognized speed limit displayed on the display.

4. The apparatus according to claim 1, wherein the recognized speed limit reporter is configured to display the recognized speed limit on a display, and if the lane change is detected by the lane change detector during display of the recognized speed limit and then determined by the speed limits misrecognition verifier that there is misrecognition of speed limits, display a message indicating that there is misrecognition of speed limits on the display.

5. The apparatus according to claim 1, wherein the lane position determiner is referred to as a first determiner, and the apparatus further comprises a second determiner configured to determine whether the vehicle follows a right-hand traffic rule or a left-hand traffic rule, and
    the speed limits misrecognition verifier is configured to, taking into account a determination made by the second determiner, determine whether or not there is misrecognition of speed limits.

6. The apparatus according to claim 5, wherein
    the vehicle is traveling on a road having a one-directional road section with a plurality of lanes, and
    the speed limits misrecognition verifier is further configured to, if determined by the second determiner that the vehicle follows the right-hand traffic rule, if a lane change of the vehicle has been detected by the lane change detector, if determined by the first determiner that a lane traveled immediately after the lane change is positioned rightward of a lane traveled immediately before the lane change, and if a speed limit recognized immediately after the lane change is greater than a speed limit recognized immediately before the lane change, determine that there is misrecognition of speed limits.

7. The apparatus according to claim 5, wherein
    the vehicle is traveling on a road having a one-directional road section with a plurality of lanes, and
    the speed limits misrecognition verifier is further configured to, if determined by the second determiner that the vehicle follows the right-hand traffic rule, if a lane change of the vehicle has been detected by the lane change detector, if determined by the first determiner that a lane traveled immediately after the lane change is positioned leftward of a lane traveled immediately before the lane change, and if a speed limit recognized immediately after the lane change is less than a speed limit recognized immediately before the lane change, determine that there is misrecognition of speed limits.

8. The apparatus according to claim 5, wherein
the vehicle is traveling on a road having a one-directional road section with a plurality of lanes, and
the speed limits misrecognition verifier is further configured to, if determined by the second determiner that the vehicle follows the left-hand traffic rule, if a lane change of the vehicle has been detected by the lane change detector, if determined by the first determiner that a lane traveled immediately after the lane change is positioned rightward of a lane traveled immediately before the lane change, and if a speed limit recognized immediately after the lane change is less than a speed limit recognized immediately before the lane change, determine that there is misrecognition of speed limits.

9. The apparatus according to claim 5, wherein
the vehicle is traveling on a road having a one-directional road section with a plurality of lanes, and
the speed limits misrecognition verifier is further configured to, if determined by the second determiner that the vehicle follows the left-hand traffic rule, if a lane change of the vehicle has been detected by the lane change detector, if determined by the first determiner that a lane traveled immediately after the lane change is positioned leftward of a lane traveled immediately before the lane change, and if a speed limit recognized immediately after the lane change is greater than a speed limit recognized immediately before the lane change, determine that there is misrecognition of speed limits.

\* \* \* \* \*